(12) United States Patent
Kim

(10) Patent No.: US 7,136,579 B2
(45) Date of Patent: Nov. 14, 2006

(54) METHOD OF AND APPARATUS FOR SELECTING SUBTITLES FROM AN OPTICAL RECORDING MEDIUM

(75) Inventor: Doo-nam Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1174 days.

(21) Appl. No.: 10/082,166

(22) Filed: Feb. 26, 2002

(65) Prior Publication Data

US 2003/0039472 A1 Feb. 27, 2003

(30) Foreign Application Priority Data

Aug. 25, 2001 (KR) ............................. 2001-51582

(51) Int. Cl.
*H04N 5/91* (2006.01)
(52) U.S. Cl. .................................... 386/125; 386/95
(58) Field of Classification Search .............. 386/125
See application file for complete search history.

(56) References Cited

U.S. PATENT DOCUMENTS

| | | | |
|---|---|---|---|
| 5,652,824 A | 7/1997 | Hirayama et al. | |
| 5,712,950 A * | 1/1998 | Cookson et al. | 386/97 |
| 5,778,142 A | 7/1998 | Taira et al. | |
| 6,009,234 A | 12/1999 | Taira et al. | |
| 6,429,879 B1 * | 8/2002 | Sturgeon et al. | 715/723 |
| 6,970,638 B1 * | 11/2005 | Miyagawa | 386/46 |

FOREIGN PATENT DOCUMENTS

| | | |
|---|---|---|
| JP | 11-16283 | 1/1999 |
| KR | 1998-75490 | 11/1998 |

* cited by examiner

*Primary Examiner*—Thai Tran
*Assistant Examiner*—Heather R. Jones
(74) *Attorney, Agent, or Firm*—Staas & Halsey LLP

(57) ABSTRACT

A system for reproducing a subtitle from an optical recording medium and a method thereof. The system reconfigures a subtitle menu during reproducing data from an optical disc and selects the reconfigured menu in order to play the optical disc. The method includes selecting a play menu from the optical recording medium to be played, reconfiguring and storing menu execution information, and executing the play menu previously reconfigured whenever playing the previously played optical disc or a newly played optical disc. Once a setup menu is reconfigured before or during playing of the disc. the previously configured menu is applied when the optical disc is played again or a new optical disc is played.

52 Claims, 2 Drawing Sheets

METHOD OF AND APPARATUS FOR SELECTING SUBTITLES FROM AN OPTICAL RECORDING MEDIUM

CROSS-REFERENCE TO RELATED APPLICATIONS

This application claims the benefit of Korean Application No. 2001-51582 filed on Aug. 25, 2001 in the Korean Patent Office, the disclosure of which is incorporated herein by reference.

BACKGROUND OF THE INVENTION

1. Field of the Invention

The present invention relates to a method and a system for reproducing a subtitle in accordance with a user's preference from an optical recording medium, and more particularly, to a method of and a system selecting a user's preference for a subtitle from a subtitle menu during reproducing data from a first optical recording medium, storing the user's preference for the subtitle, and reproducing data from a second optical recording medium in accordance with the user's preference which has been set-up during reproducing data from the first optical recording medium by reconfiguring the subtitle menu of the second optical recording medium in response to the stored user's preference for the subtitle of the first optical record medium.

2. Description of the Related Art

A Digital Video Disc (DVD) is a storage medium having a diameter of 12 cm and a thickness of 1.2 mm, which are the same as those of a Compact Disc (CD). However, data capacity of the DVD is 7 times greater than that of the CD which stores approximately 688 MB of data, which can be played for about 74 minutes. Even though DVDs have the same diameter and thickness as CDs, the data capacity of DVDs ranges from 4.7 GB to 17 GB depending on the number of layers forming the DVD.

Since DVDs have a capacity large enough to adopt MPEG-2 compression, which places priority on video quality, it can provide excellent quality video, unlike CDs adopting MPEG-1, which maximizes compression at the expense of the video quality.

In addition, the DVDs store various data including audio data, multilingual caption data and various other set-up data.

A set-up menu provides the user to select the user's preference for the audio data, the multilingual caption data, and the various setup data. The respective audio data and multilingual caption data are reproduced from the DVD in accordance with the user's preference. The user selects the user's preference through an interactive interface that enables the user to select what the user wants among the respective audio data, multilingual caption data and the other set-up data. The multilingual caption data includes up to 32 languages. Multilingual voice caption data provides up to 8 languages. The audio data includes channel data corresponding to 6 speakers such as front right/left, rear right/left, central and low sound speakers. The set-up menu for the other set-up data includes a multistory function, a multi-angle function, and a parental guide function. The multistory function allows the user to select any one of categorized movies. The multi-angle function provides the user with scenes shot at different angles. The parental guide function prevents unauthorized users from viewing scenes.

The set-up menu provided by the DVD includes a subtitle menu for setting the kind of the language and the caption. The subtitle menu helps the user to select the kind of the language and the caption, and the optical recording medium is reproduced in languages of different countries in response to the user's selection. However, it is very disadvantageous and inconvenient that the user's preference should be set-up in the subtitle menu whenever a new optical recording medium is loaded and reproduced.

SUMMARY OF THE INVENTION

To solve the above-described problems, it is an object of the present invention to provide a method of reproducing a subtitle from an optical medium in according to a previously set-up subtitle menu by automatically reconfiguring a subtitle menu designed to set up the kind of the language and the caption during reproducing of a second optical medium by using the previously set-up subtitle menu.

It is another object to provide a system for storing a user's preference for the kind of language and caption from a subtitle menu of an optical medium and for reconfiguring a subtitle menu for a newly loaded optical medium with the stored user's preference.

It is still another object to provide a subtitle set-up method able to eliminate a set-up process for a user's preference whenever a new optical medium is reproduced.

It is yet another object to provide a subtitle set up method capable of reconfiguring a subtitle menu by using a previously stored subtitle menu whenever a new optical medium is loaded and reproduced.

These and other objects may be achieved by providing an improved system connected to an optical medium player and a monitor to control the optical medium player and reproduce data from an optical medium loaded in the optical medium player in accordance with a user's preference relating to a main menu and a subtitle menu. The system reconfigures menu execution information of the main menu and the subtitle menu read from an optical disk, stores the reconfigured menu execution information in a non-volatile memory, and reproduces data from a newly loaded optical disk in response to the stored menu execution information.

When the system receives new menu execution information reproduced from a new optical medium loaded in the optical medium player, the system generates the new menu execution information and the stored menu execution information. A monitor connected to the optical medium player and the system displays a visual image in response to both the new menu execution information and the stored menu execution information.

The system reproduces data from a newly loaded optical disk in accordance with the stored menu execution information regardless of the menu execution information reproduced from a newly loaded optical disk.

BRIEF DESCRIPTION OF THE DRAWINGS

The above and other objects and advantages of the present invention will become more apparent by describing in detail preferred embodiments thereof with reference to the attached drawings in which.

DETAILED DESCRIPTION OF THE PREFERRED EMBODIMENTS

Figure 1:
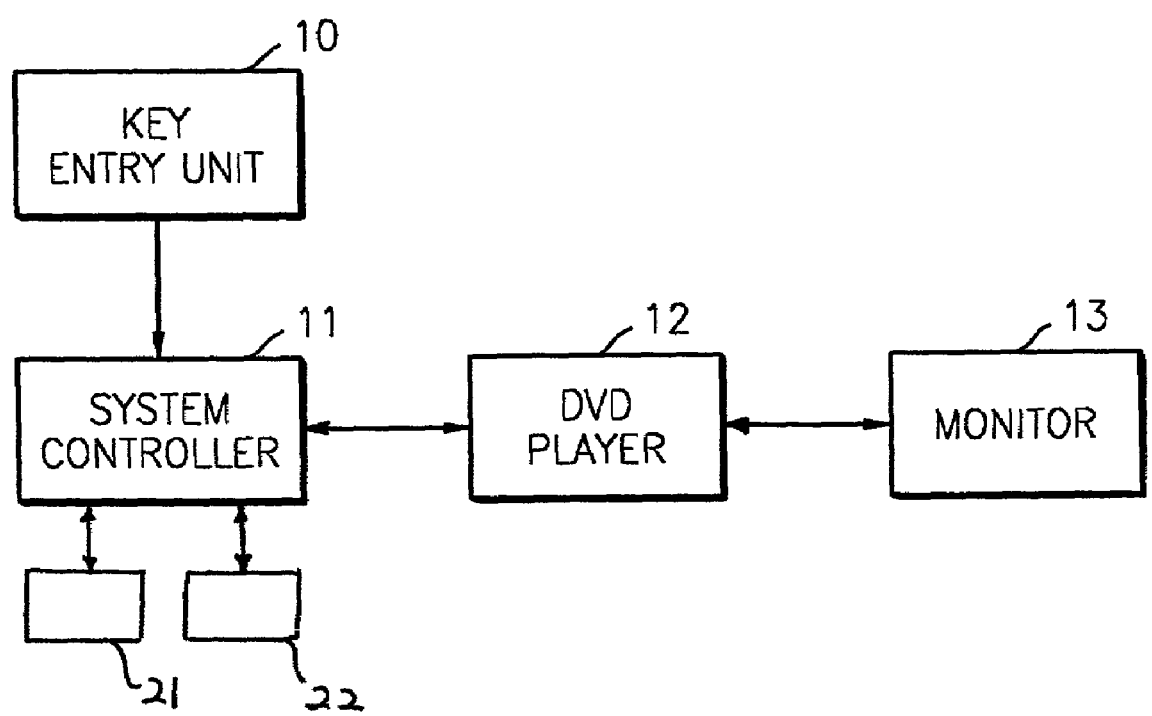
FIG. 1 is a block diagram showing the configuration of a system for reproducing data from an optical recording medium according to an embodiment of the present invention.

Reference now should be made to the drawings, in which the same reference numerals are used throughout the different drawings to designate the same or similar components.

To achieve the above and other objects according to the present invention, a method of reproducing data from an optical recording medium is implemented in an optical recording medium player system. The method includes selecting a user's preference for a subtitle menu from menu execution information reproduced from the optical recording medium to be played, reconfiguring the subtitle menu having menu execution information in response to the user's preference for the subtitle, storing the subtitle menu having the reconfigured menu execution information, and executing the stored or configured subtitle menu whenever a new optical recoding medium is played.

According to the present invention, the reconfiguration of the menu execution information is set as a specification in the manufacturing stage of the optical recording medium play system.

The present invention will be described in detail with reference to the attached drawings. FIG. 1 is a block diagram showing the configuration of a system for playing an optical recording medium. As shown in FIG. 1, the system includes a key entry unit 10, a system controller 11, a DVD player 12 and a monitor 13.

Figure 2:
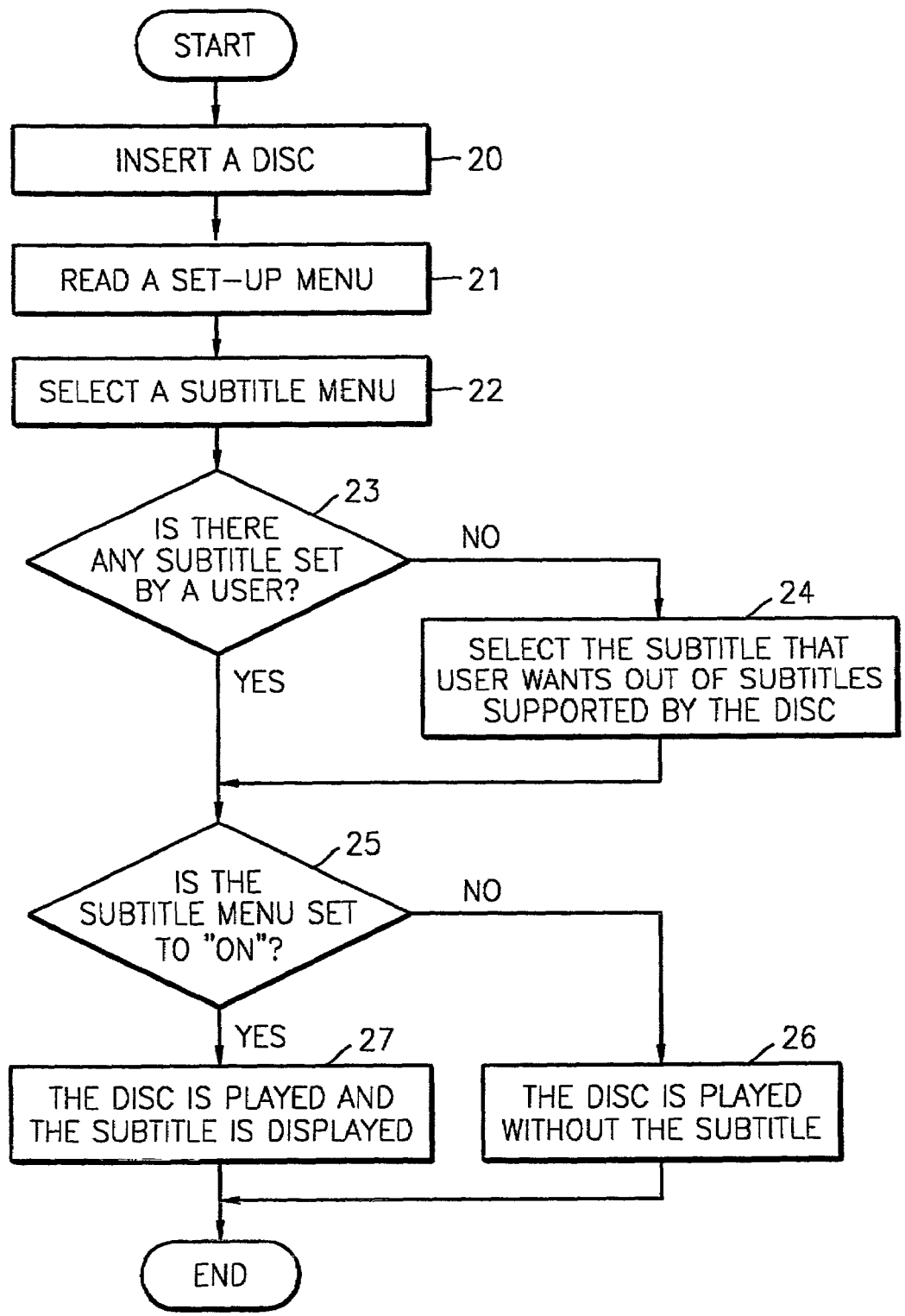
FIG. 2 is a flow diagram showing a method of reproducing data the optical recording medium according to the embodiment of the present invention.

FIG. 2 is a flow chart showing a method of playing the optical recording medium according to the present invention. The method of playing the optical recording medium includes the steps of inserting a disc into the DVD player 12 in operation 20, reading the set-up menu from the disc in operation 21, selecting a subtitle menu from the set-up menu in operation 22, making a first determination of whether a subtitle set up by a user exists in operation 23, selecting the subtitle from subtitles supported by the disc in operation 24 in response to the first determination, making a second determination of whether the subtitle menu is set to ON in operation 25, playing the disc without the subtitle in response to the second determination being negative in operation 26, and playing the disc and displaying the subtitle on a monitor 13 connected to the DVD player 12 through the system controller in operation 27 in response to the second determination being positive.

The present invention will be described in detail with reference to FIGS. 1 and 2.

The key entry unit 10 includes a menu introduction key and an introduction release key. The key entry unit 10 generates a key signal corresponding to one of the menu introduction key and the introduction release key so that the DVD player 12 operates as requested by the user.

The system controller 11 controls the operation of the DVD player 12 according to the key signal generated by the key entry unit 10 and each input signal generated by each component of the DVD player 12.

The DVD player 12 processes the key and input signals to reproduce the DVD disc under the control of the system controller 11.

The monitor 13 displays an image corresponding to the video signal generated from the DVD player 12 through the system controller 11.

The following section describes how the optical recording medium is played with the system including the above components.

The subtitle menu is one of the most frequently used menus in the DVD players. For example, a user who wishes to study English will set up an English caption in the subtitle menu. If the user wants to watch a movie with a native language, he will set up a language caption to his native language. If the subtitle menu is set to ON or OFF as required to be set by the user before or when the disc is played, the same caption as previously set up by the user is automatically turned ON or OFF and displayed on the monitor 13 even when other discs are played in the DVD player 12.

A user inserts the optical disc into the DVD player 12 in operation 20. The set-up menu is read from the optical disc in operation 21 after the optical disc is inserted in operation 20. The user enters a set-up menu read command signal through the key entry unit 10. The system controller 11 reads the set-up menu data from the optical disc in response to the set-up menu read command signal. The DVD player 12 processes the set-up menu data through the system controller 11 so that the set-up menu can be displayed on the monitor 13.

The subtitle menu is selected through the set-up menu displayed on the monitor 13 in operation 22.

The first determination of whether a subtitle previously set by a user exists is made in operation 23.

If there are no previously set subtitles, the user is supposed to select a subtitle from the subtitles read from the optical disc in operation 24.

The second determination of whether the previously set subtitle or the newly set subtitle is set to ON is made in operation 25.

If the subtitle function is not set to "ON", that is, the subtitle is set to "OFF", the optical disc is played without the subtitle in operation 26. If the subtitle function is set to "OFF", no language is displayed on the monitor 13, and only the video and audio data is reproduced from the optical disc in the DVD player 12. The video image corresponding to the video data is displayed on the monitor 13.

If the subtitle function is set to "ON", the subtitles are displayed on the monitor 13 when the optical disc is played. The system controller 11 detects the "ON" signal of the subtitle set by the user and stored in a memory included in the system controller 11 or the DVD player 12, combines the video signal to be reproduced by the DVD player 12 with the caption data in response to the stored ON signal of the subtitle and displays the video image corresponding to the combined data on the monitor 13.

In addition, the system controller 11 stores in the memory, such as a RAM 21 or an EEPROM 22, the ON status of the subtitle previously set by the user and automatically displays the stored subtitle on the monitor 13 when another optical disc different from the previously played optical disc is played. Therefore, once the user sets the subtitle function to "ON" before or during playing of the optical disc, the caption corresponding to the previously set subtitle is reproduced whenever any optical disc other than the previously played optical disc is newly inserted into and played in the DVD player 12 after the previously played optical disc has been removed from the DVD player 12.

Since the subtitles previously set by the user are stored in the memory, such as the EEPROM, the caption corresponding to the previously set subtitle is reproduced from both the previously played optical disc and the newly inserted optical disc even if the DVD player 12 is turned off and on. Moreover, the caption corresponding to the previously set subtitle may be reproduced from the previously played optical disc or the newly inserted optical disc after the previously played optical disc is removed and inserted again without turning off and on the DVD player 12.

Therefore, the system controller 11 may include two different memories. The first memory is the RAM 21 storing the main menu, the subtitle menu and execution information relating to the main menu and the subtitle menu which are read from the previously played optical disk. The RAM may stores the reconfigured execution information set by the user so that the caption corresponding to the reconfigured execution information is reproduced whenever any optical disc other than the previously played optical disc is newly inserted into and played in the DVD player 12 after the previously played optical disc has been removed from the DVD player 12.

The second memory is the non-volatile memory storing the reconfigured execution information set by the user. The non-volatile memory stores the reconfigured execution information when the previously played optical disk is unloaded from the optical disk player system and even if the optical disk player system is turned off and on. Accordingly, when the previously played optical disk is unloaded from the optical disk player system and a new optical disk is loaded into the optical disk player system, the new optical disk is reproduced in accordance with the reconfigured execution information which has been stored in the EEPROM.

The system controller 11 may generate second menu execution information received from the second optical disk and the stored menu execution information to the monitor 13 when the second optical medium is loaded into the DVD player 12. The monitor 13 connected to the system controller 11 may display video images corresponding to both the second menu execution information and said stored menu execution information. The system controller 11 controls the DVD player 12 in accordance with the stored menu execution information regardless of any menu execution information generated from the DVD player 12. The system controller 11 generates the second menu execution information and the stored menu execution information when the second optical disk is loaded into the DVD player 12 after the previously played optical disk has been removed from the DVD player 12.

The subtitle "ON" function can be set as a specification in the manufacturing process of the DVD player 12. As a result, if the user selects one type of subtitles, the user can enjoy the same captions as the user previously set whenever the optical disc is played.

While this invention has been particularly shown and described with reference to preferred embodiments thereof, it will be understood by those skilled in the art that various changes in form and details may be made therein without departing from the spirit and scope of the invention as defined by the appended claims.

As described above, the present invention reconfigures a setup menu before a disc play and plays the optical disc by selecting the reconfigured menu. Therefore, since the user need not reconfigure other setup menus he can enjoy discs with maximized conveniences.

Although a preferred embodiment of the present invention has been described for illustrative purpose, those skilled in the art will appreciate that various modifications, additions, and substitutions are possible, without departing from the scope and spirit of the invention as disclosed in the accompanying claims.

What is claimed is:

1. A method of reproducing data from an optical medium using an optical medium player system, comprising:
    selecting a menu read from a first optical medium;
    reconfiguring menu execution information relating to said selected menu and storing said reconfigured menu execution information of said selected menu; and
    reproducing said data from a second optical medium in accordance with said stored menu execution information of said selected menu after said second optical medium is loaded in said optical medium player system.

2. The method of claim 1, wherein said menu execution information is set in a manufacturing process of said optical medium player system.

3. The method of claim 1, further comprising generating second menu execution information and said reconfigured menu execution information by reproducing said second menu execution information from said second optical medium.

4. The method of claim 3, further comprising displaying a video image corresponding to said second menu execution information and said reconfigured menu execution information.

5. The method of claim 1, wherein said menu execution information read from said first optical medium is stored in a first memory during loading of said first optical medium in said optical medium player system.

6. The method of claim 1, wherein said reconfigured menu execution information is stored in a second memory different from said first memory.

7. The method of claim 1, further comprising reproducing said data from said second optical medium in accordance with said stored menu execution information after said optical medium player system is turned off and on before said second optical medium is loaded into said medium player system.

8. The method of claim 1, further comprising reproducing said data from said second optical medium in accordance with said stored menu execution information when said second optical medium is inserted into said optical medium player system after said first optical medium has been removed from said optical medium player system.

9. The method of claim 1, further comprising storing said menu execution information in a first memory while storing said reconfigured menu execution information in a second memory, said second memory being a non-volatile memory.

10. The method of claim 9, wherein said first memory is a RAM while said second memory is an EEPROM.

11. An optical medium player system, comprising:
    an optical medium player reading menu execution information from a first optical medium; and
    a controller coupled to said optical medium player, reconfiguring said menu execution information received from said optical medium player, controlling said optical medium player to reproduce data from a second optical medium in accordance with said reconfigured menu execution information after said second optical medium is loaded into said optical medium player.

12. The system of claim 11, wherein said reconfigured menu execution information corresponds to a subtitle representing a language caption.

13. The system of claim 11, comprising:
    a volatile memory coupled to said controller, storing said menu execution information: and
    a non-volatile memory coupled to said controller, storing said reconfigured menu execution information.

14. The system of claim 11, said optical medium player transmitting said menu execution information to said controller after a first optical medium is loaded into said optical medium player.

15. The system of claim 14, said optical medium player receiving from said controller said reconfigured menu execution information during reproducing of said data from said second optical medium by said optical medium player after said first optical medium is removed from said optical medium player.

16. The system of claim 11, said controller controlling said optical medium player in accordance with one of said menu execution information and reconfigured said menu execution information when a first optical medium is loaded into said optical medium player.

17. The system of claim 16, said controller controlling said optical medium player in accordance with said reconfigured menu execution information when a second optical medium is loaded into said optical medium player after said first optical medium is removed from said optical medium player.

18. The system of claim 17, said controller receiving second menu execution information from said optical medium player when said second optical medium is loaded into said optical medium player.

19. The system of claim 18, said controller generating said second menu execution information and said stored menu execution information.

20. The system of claim 18, further comprising a monitor connected to said controller and said optical medium player, displaying video images corresponding to both said second menu execution information and said stored menu execution information.

21. The system of claim 11, said controller receiving said menu execution information from said optical medium player when a first optical medium is loaded into said optical medium player, receiving a second menu execution information from said optical medium is loaded into said optical medium player.

22. The system of claim 21, said controller generating said second menu execution information and said stored menu execution information when said second optical medium is loaded into said optical medium player.

23. The system of claim 22, further comprising a monitor connected to said controller, displaying video images corresponding to both said second menu execution information and said stored menu execution information.

24. The system of claim 11, said controller controlling said optical medium player in accordance with said stored menu execution information regardless of any menu execution information generated from said optical medium player.

25. The system of claim 11, said controller reproducing said data from said second optical medium in accordance with said stored menu execution information after said optical medium player is turned off and on before said second optical medium is loaded into said medium player.

26. A method in an optical medium player system, comprising:
reconfiguring menu execution information read from a first optical medium; and
reproducing data from a second optical medium in accordance with said reconfigured menu execution information after said second optical medium is loaded in said optical medium player system.

27. The method of claim 26, comprising reproducing data from said first optical medium in accordance with said reconfigured menu execution information.

28. The method of claim 26, wherein said data is reproduced from said second optical medium in accordance with said reconfigured menu execution information regardless of a second menu execution information read from said second optical medium.

29. The method of claim 26, wherein said first optical medium is different from said second optical medium.

30. The method of claim 26, wherein said data read from said second optical medium corresponds to said reconfigured menu execution information.

31. The method of claim 26, comprising making a determination of whether said data corresponding to said reconfigured menu execution information exists in said second optical medium.

32. The method of claim 31, comprising reproducing second data from said second optical medium in response to said determination being negative, said second data different from said data.

33. The method of claim 26, wherein said data is generated from said second optical medium in accordance with either one of said reconfigured menu execution information and a second menu execution information read from said second optical medium.

34. The method of claim 26, wherein said reconfigured menu execution information includes a language caption.

35. The method of claim 26, wherein a language caption corresponding to said reconfigured menu execution information is reproduced from said second optical medium.

36. The method of claim 26, wherein said data is reproduced from said second optical medium in accordance with said stored menu execution information after said optical medium player system is turned off and on before said second optical medium is loaded into said medium player system.

37. A method in an optical medium player system, comprising:
reading a menu from a first optical medium;
selecting a subtitle from said menu;
reconfiguring said first subtitle; and
reproducing data from a second optical medium in accordance with said reconfigured subtitle after said second optical medium is loaded in said optical medium player system.

38. The method of claim 37, further comprising:
making a determination of whether said reconfigured subtitle is applied to said second optical medium; and
reproducing said data from said second optical medium in accordance with said determination being positive.

39. The method of claim 37, further comprising:
reading a second menu having a second subtitle from said second optical medium; and
reproducing second data from said second optical menu in response to said second subtitle in accordance with said determination being negative.

40. The method of claim 39, wherein said reconfigured subtitle representing a first language caption while said second subtitle representing a second language caption different from said first language caption.

41. The method of claim 37, further comprising:
making a determination of whether said reconfigured subtitle is applied to said second optical medium; and
reproducing second data from said second optical menu in response to said second subtitle in accordance with said determination being negative.

42. The method of claim 37, further comprising:
reading a second menu having a second subtitle from said second optical medium; and reproducing second data from said second optical menu in response to said second menu which is not related to said reconfigured subtitle.

43. The method of claim 37, wherein said reconfigured subtitle corresponds to a predetermined language caption.

44. The method of claim 37, wherein said data is reproduced from said second optical medium in accordance with said reconfigured subtitle after said optical medium player system is turned off and on before said second optical medium is loaded into said medium player system.

45. A method in an optical medium player system, comprising:
   reading a subtitle from a first optical medium loaded in said optical medium player system;
   reconfiguring said subtitle;
   making a determination of whether said reconfigured subtitle is applied to a second optical medium different from said first optical medium; and
   reproducing data from said second optical medium in accordance with said reconfigured subtitle in accordance with said determination being positive.

46. The method of claim 45, further comprising:
   reading a second menu from said second optical medium; and
   reproducing second data in accordance with said second menu while reading said data from said second optical medium in accordance with said reconfigured subtitle, said second menu excluding said reconfigured subtitle.

47. A method in an optical medium player system, comprising:
   reading a subtitle from a first optical medium loaded in said optical medium player system;
   making a determination of whether said subtitle is applied to a second optical medium different from said first optical medium; and
   reproducing data from said second optical medium in accordance with said subtitle.

48. The method of claim 47, further comprising:
   reading a second menu from said second optical medium; and
   reproducing second data from said second optical medium in accordance with said second menu, wherein said second menu does not corresponds to said subtitle.

49. The method of claim 47, wherein said data corresponds to a language caption while said second data does not correspond to said language caption.

50. The method of claim 47, wherein said data is reproduced from said second optical medium in accordance with said subtitle after said optical medium player system is turned off and on before said second optical medium is loaded into said medium player system.

51. A method in an optical medium player system, comprising:
   setting a subtitle function from a first disc that is loaded in the optical medium player system; and
   maintaining the subtitle function on for new discs even if the first disc is unloaded from the optical player system.

52. The method of claim 51, further comprising:
   maintaining the subtitle function on even if the optical medium player system is turned off and on again after the setting of the subtitle function.

* * * * *

UNITED STATES PATENT AND TRADEMARK OFFICE
CERTIFICATE OF CORRECTION

PATENT NO. : 7,136,579 B2 Page 1 of 1
APPLICATION NO. : 10/082166
DATED : November 14, 2006
INVENTOR(S) : Doo-nam Kim It is certified that error appears in the above-identified patent and that said Letters Patent is hereby corrected as shown below:

Title Page, (57) Column 2 (Abstract), Line 11, change "disc." to --disc,--.

Column 6, Line 61, change "information:" to --information;--.

Column 10, Line 11, change "corresponds" to --correspond--.

Signed and Sealed this

Twentieth Day of March, 2007

JON W. DUDAS
*Director of the United States Patent and Trademark Office*